R. RÖNTGEN.
APPARATUS FOR AUTOMATICALLY CHARGING HARDENING AND THE LIKE FURNACES.
APPLICATION FILED MAR. 24, 1913.
1,107,449.
Patented Aug. 18, 1914.
3 SHEETS—SHEET 1.
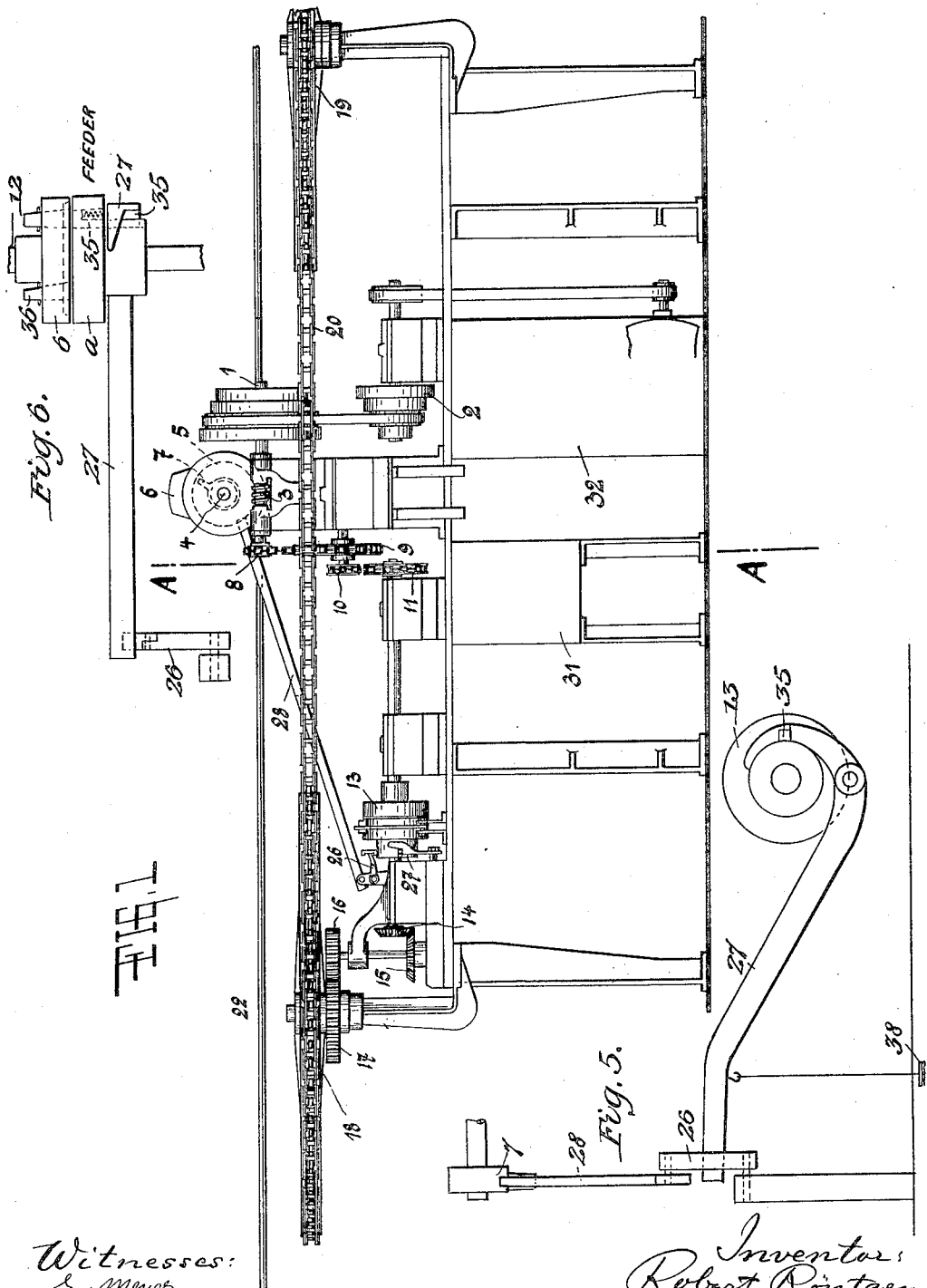

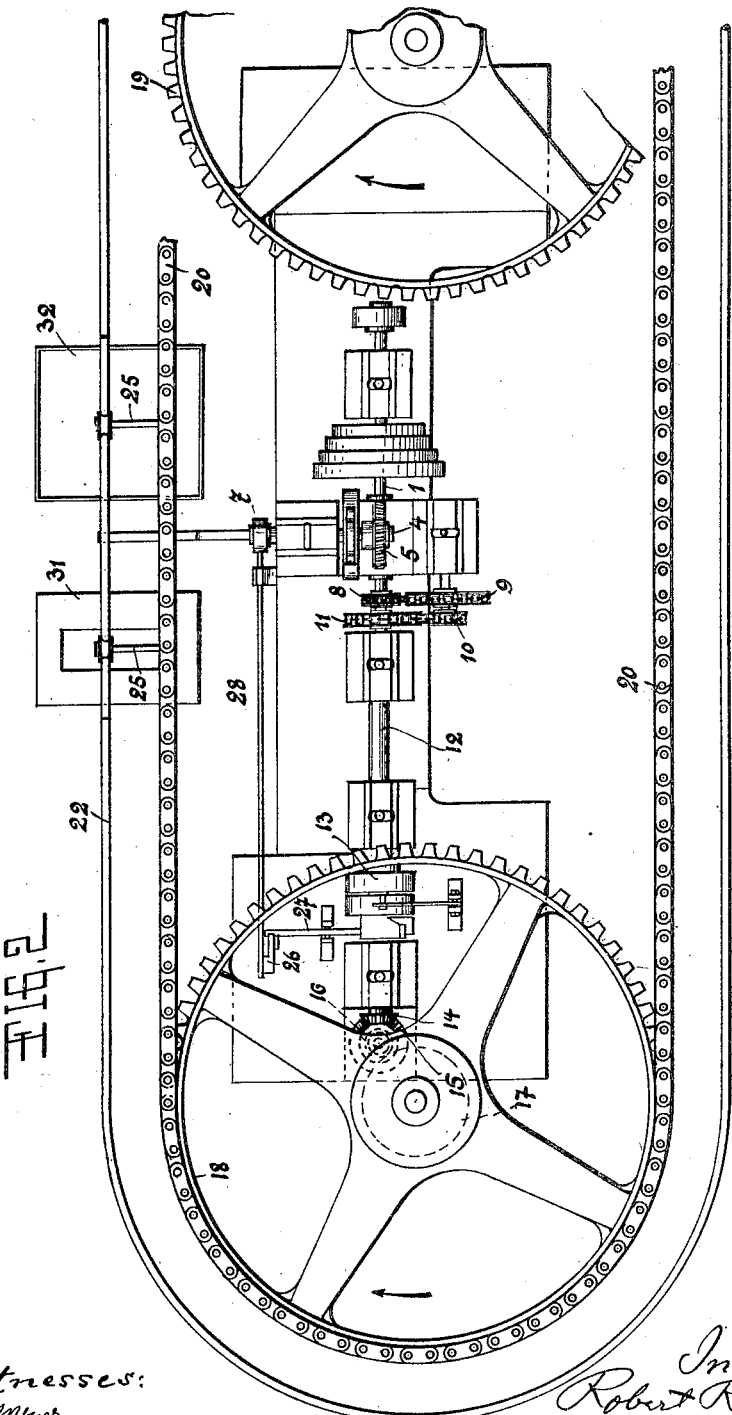

R. RONTGEN.
APPARATUS FOR AUTOMATICALLY CHARGING HARDENING AND THE LIKE FURNACES.
APPLICATION FILED MAR. 24, 1913.
1,107,449.
Patented Aug. 18, 1914.
3 SHEETS—SHEET 3.
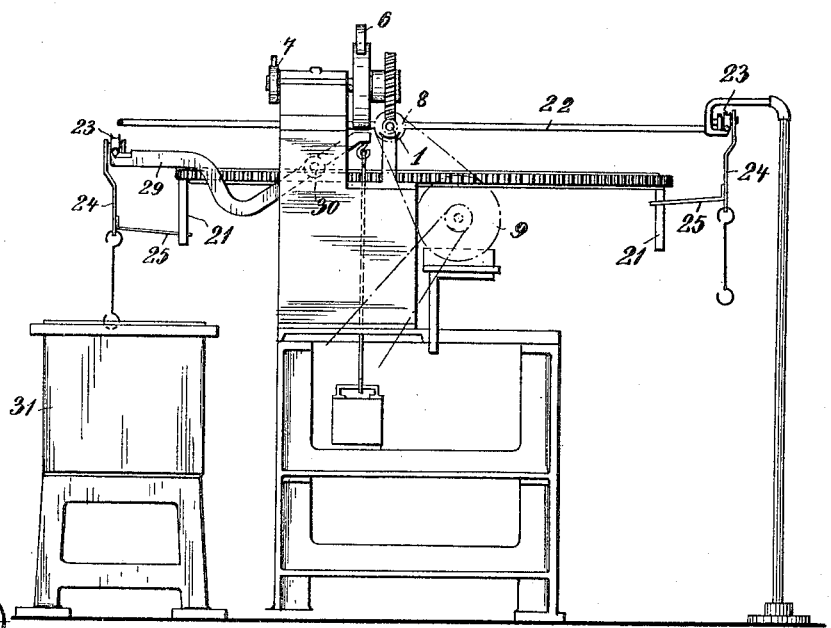
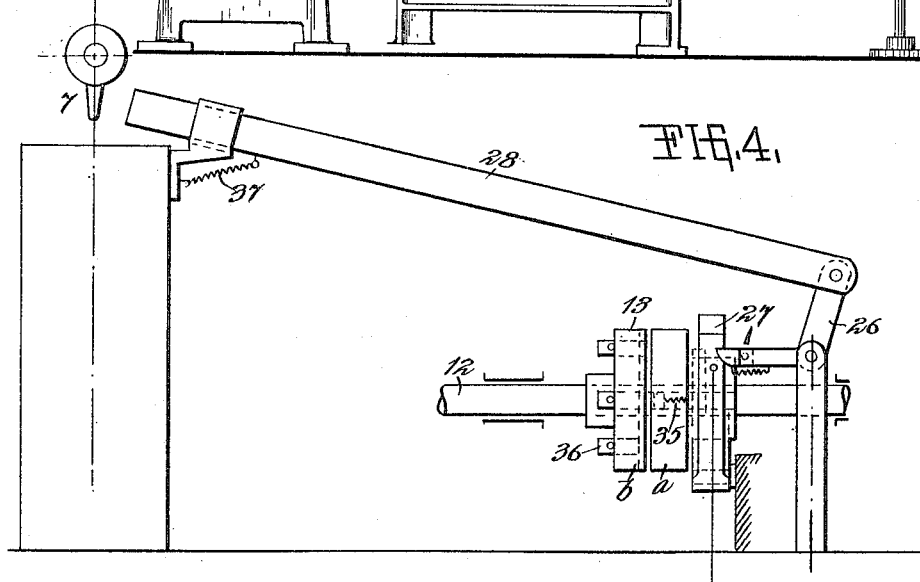

UNITED STATES PATENT OFFICE.

ROBERT RÖNTGEN, OF REMSCHEID, GERMANY.

APPARATUS FOR AUTOMATICALLY CHARGING HARDENING AND THE LIKE FURNACES.

1,107,449.

Specification of Letters Patent.

Patented Aug. 18, 1914.

Application filed March 24, 1913. Serial No. 756,449.

*To all whom it may concern:*

Be it known that I, ROBERT RÖNTGEN, a subject of the King of Prussia, residing at Remscheid, in the Kingdom of Prussia and German Empire, have invented certain new and useful Improvements Relating to Apparatus for Automatically Charging Hardening and the like Furnaces, of which the following is a specification.

My invention relates to apparatus for automatically charging hardening furnaces, salt-cyanid of potassium, lead baths or muffle furnaces, and particularly to an apparatus in which the objects to be hardened are carried in succession by means of a movably mounted suspension device to the hardening furnace, cooling bath, tempering furnace or the like and are allowed to remain therein for the necessary length of time.

The object of my invention is to provide an apparatus which renders it possible to attend to the furnaces, baths or other auxiliary devices from any desired distant place so that the workmen are not affected by the heat or the vapors of the hardening bath. Furthermore the new apparatus presents important advantages for manufacturing upon a large scale, owing to the fact that the objects to be hardened are conducted at exactly predetermined times to the heating furnace and to the chilling tank and are thus subjected to a thoroughly uniform heating and cooling.

My invention is illustrated in the accompanying drawing wherein:

Figure 1 is a side elevation partly in section. Fig. 2 is a plan, and Fig. 3 a section along line A—A in Fig. 1. Fig. 4, Fig. 5 and Fig. 6 are detail views showing the clutch and the actuating mechanism therefor.

The main shaft 1 is driven by a stepped pulley countershaft 2. Upon the shaft 1 the worm 3 is arranged and this worm meshes with the worm wheel 5 mounted upon the shaft 4. The cam plate 6 and the finger 7 are secured to the shaft 4. The shaft 12 is driven from the shaft 1 through sprocket wheels 8, 9, and 10, 11. The clutch 13 is arranged upon the shaft 12 and by throwing this clutch in or out the shaft 12 can be clutched to the pair of bevel pinions 14 and 15 and thereby to the pair of gear wheels 16 and 17, or disengaged therefrom. The chain wheel 18 is rigidly connected with the gear wheel 17. At an interval from and opposite to the chain wheel 18 a second chain wheel 19 is provided. Over these wheels 18 and 19 passes an endless chain 20 having drivers 21 consisting of pins or studs fastened to individual links of said chain, two such pins being shown in Fig. 3.

22 is a rail upon which movable suspension devices 24 run on rollers 23 and serve for the reception of the objects to be hardened. These suspension devices 24 are provided with laterally extending arms 25 which project into the path of the said drivers 21 so as to be engaged by them, as they move with the chain, the drivers 21 thus taking the suspending devices 24 along with them.

The clutch 13 between the shaft 12 and the bevel wheels 14, 15 is thrown in by the levers 26 and 27 and the rod 28 as soon as the latter is struck by the finger 7 on shaft 4, the rod 28 being shifted thereby so as to rock the bell-crank lever 26, the horizontal arm of which lever lifts the lever 27 which operates the clutch as follows: Owing to the upward movement of the lever 27 a movable spring-presser pin or bolt 35 in the clutch member $a$ (Figs. 4, 5 and 6) is released and enters a recess in the other clutch member $b$, being therein in the path of pins or bolts 36 adapted to engage the pin or bolt 35, the clutch thus being thrown in. As soon as finger 7 on shaft 4, however, has passed over the end of rod 28 the latter is returned to its original position by a spring 37 (Figs. 4, 5 and 6), and the clutch-operating lever 27 is likewise returned to its original position by a weight 38, by which movement the pin 35 is withdrawn from the clutch member $b$, the clutch thus being thrown out again. The cam plate 6 on shaft 4 acts by means of its elevation upon a rocker 29 fulcrumed at 30 on the central part of the frame between chain-wheels 18 and 19. When the rocker 29 oscillates a portion of the rail 22, (that is to say the portion arranged above the hardening furnace, 31, and cooling bath 32,) is either lowered with the suspension devices 24 arranged thereon, as indicated in Fig. 3, or raised. In the latter case the previously lowered part of the rail 22 is transferred to the plane of the immovable portion of this rail and the suspension devices with the objects to be hardened that are arranged thereon are removed entirely automatically from the hardening furnace, and the cooling bath.

The operation of the apparatus is as follows: Upon the rail 22 a suitable number of suspension devices 24 are arranged; these are connected with the conveyer chain 20 by means of the drivers 21 and 25. When the shaft 1 is driven, the shaft 4 is rotated, and the shaft 12 is also driven through the sprocket wheels 8, 9 and 10, 11. So long as the clutch is not thrown in the chain wheels 18, 19 and consequently the chain 20 are stationary. As soon as the protuberances of the cam plate 6 encounter the rocker 29, the latter is caused to oscillate around its pivot 30 and the end carrying the movable portion of the rail 22 is raised so that the running rail 22 is uninterrupted or closed over the furnace 31 and the tank 32. During the continued rotation of the shaft 4 with the cam plate 6 and the finger 7 the end of the lever 29 carrying the movable portion of the rail 22 with the suspension devices 24 thereon descends, and the objects suspended on these devices are lowered into the furnace and there are heated. Upon the further rotation of the shaft 4 the cam plate 6 lifts the oscillating lever 29 and simultaneously the finger 7 acts upon the rod 28. As soon as the rocker 29 is raised again and the track 22 closes the finger 7 displaces the rod 28, whereby the levers 27 and 26 are raised and the clutch is thrown in. Consequently the bevel pinions 14 and 15 and the spur wheels 16 and 17 are driven as the chain wheels 18 and 19 are rotated, and with them the chain 20 is driven. The levers 26, 27 and the rod 28 return to their initial position, whereupon after another revolution of the shaft 4 the clutch 13 is again automatically thrown out. By the rotation of the chain wheels 18 and 19 and the displacement of the chain 20 the article that has just been raised from the furnace 31 is again caused to move forward, so that it is now suspended over the tank 32. The next article carried by the suspension device has now passed from the stationary portion of the track onto its movable portion, that is acted upon by the rocker 29, and has come over the furnace 31. When the descent of the rocker takes place together with the movable portion of the track, the heated article enters the tank 32 filled with water or oil, while the other article located above the furnace 31 is introduced therein, so that upon the next operative movement it may come above the tank 32, while simultaneously a fresh article comes above the furnace.

What I claim is:

1. An automatic apparatus for carrying articles to be hardened successively to the heating furnace and the chilling bath, comprising a running rail or track, devices for carrying the articles and adapted to run on said track, a portion of the track located above the furnace and bath and arranged to be located out of and lifted into alinement with the stationary part of the track, a means carrying said movable portion of the track, and a means for operating said carrying means in order to lower and lift said movable track portion at and for a given time, to introduce the articles carried by the carrying means, successively into the furnace and the bath.

2. An automatic apparatus for carrying articles to be hardened successively to the heating furnace and the chilling bath, comprising a running rail or track, devices for carrying the articles, and adapted to run on said track, a portion of the track located being above the furnace and bath and arranged to be lowered out of and lifted into alinement with the stationary part of the track, a lever carrying the movable track portion, and a means for turning said lever on its pivot, in order to lower and lift said movable track portion at and for a given time to introduce the articles carried by the carrying means, successively into the furnace and the bath.

3. An automatic apparatus for carrying articles to be hardened successively to the heating furnace and the chilling bath, comprising a running rail or track, devices for carrying the articles and adapted to run on said track, a portion of the track being located above the furnace and bath and arranged to be lowered out of and lifted into alinement with the stationary part of the track, a lever carrying the movable track portion, a means for operating said lever, and an endless chain with drivers for periodically actuating the devices carrying the articles, to run on the track.

4. An automatic apparatus for carrying articles to be hardened successively to the heating furnace and the chilling bath, comprising a running rail or track, devices for carrying the articles and adapted to run on said track, a portion of the track being located above the furnace and bath and arranged to be lowered out of and lifted into alinement with the stationary part of the track, a lever carrying the movable track portion, a means for operating said lever, an endless chain with drivers for periodically actuating the devices carrying the articles and a clutch for rendering the drivers operative and inoperative at given lengths of time by throwing said clutch in and out.

5. An automatic apparatus for carrying articles to be hardened successively to the heating furnace and the chilling bath, comprising a running rail or track, devices for carrying the articles and adapted to run on said track, a portion of the track being located above the furnace and bath and arranged to be lowered out of and lifted into alinement with the stationary part of the track, a lever carrying the movable track portion, a means for operating said lever, an endless chain with drivers for periodically actuating the devices carrying the articles, a clutch to operate the drivers, a means for operating the said clutch, a cam plate to operate the said lever, and a shaft on which both the clutch operating means and the cam plate are mounted for synchronic actuation.

In testimony whereof I have affixed my signature in presence of two witnesses.

ROBERT RÖNTGEN.

Witnesses:
HENRY HASPER,
WOLDEMAR HAUPT.

Copies of this patent may be obtained for five cents each, by addressing the "Commissioner of Patents, Washington, D. C."